(12) United States Patent
Bauer et al.

(10) Patent No.: US 6,393,342 B2
(45) Date of Patent: May 21, 2002

(54) METHOD AND DEVICE FOR CONTROLLING OPERATING SEQUENCES IN A VEHICLE

(75) Inventors: Juergen Bauer, Leonberg; Rajendranath Goswami, Stuttgart; Volker Pitzal, Waldstetten/Wissgoldingen; Ute Gappa, Frankfurt; Udo Schulz, Vaihingen/Enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/752,020

(22) Filed: Dec. 28, 2000

(30) Foreign Application Priority Data

Dec. 30, 1999 (DE) .......................... 199 64 013

(51) Int. Cl.[7] ............................ B60R 16/02; G06F 9/44
(52) U.S. Cl. ............................. 701/1; 701/35; 707/203
(58) Field of Search ....................... 701/1, 29, 35, 701/36, 101, 102, 115; 707/203, 511; 717/4

(56) References Cited

U.S. PATENT DOCUMENTS

| 5,138,548 A | | 8/1992 | Kienle ..................... 714/48 |
| 5,826,211 A | * | 10/1998 | Kobayashi ................. 123/480 |
| 5,944,767 A | | 8/1999 | Gerstung et al. ........... 701/102 |

FOREIGN PATENT DOCUMENTS

| DE | 38 02 241 | 8/1989 |
| DE | 35 43 966 | 6/1996 |
| GB | 2 232 272 | 12/1990 |
| GB | 2 247 757 | 3/1992 |
| GB | 2 277 999 | 11/1994 |
| WO | WO 93/20490 | 10/1993 |

* cited by examiner

Primary Examiner—Tan Nguyen
(74) Attorney, Agent, or Firm—Kenyon & Kenyon

(57) ABSTRACT

A method and a device for controlling operating sequences in a vehicle using at least one control unit having at least one non-volatile memory element, control being performed as a function of the respective vehicle version and/or control unit version, and the respective functions are selected during function selection by defining an identifier according to the version used, at least one predefinable data record and/or program code in the memory element corresponding to the selected functions, and the data record and/or program code being selected from a plurality of data records and/or program codes. The plurality of data records and/or program codes is generated during a version selection, the identifier containing configuration parameters, and the configuration parameters being used for determining the data record and/or the program code, the respective identifier, i.e. the configuration parameters being used for the selection of the version and the selection of the function.

12 Claims, 4 Drawing Sheets

METHOD AND DEVICE FOR CONTROLLING OPERATING SEQUENCES IN A VEHICLE

FIELD OF THE INVENTION

The present invention relates to a method and a device for controlling operating sequences in a vehicle using at least one control unit having at least one non-volatile memory element, control being performed as a function of the respective vehicle version and/or control unit version.

BACKGROUND INFORMATION

German Published Patent Application No. 38 02 241 describes an electronic controller for motor vehicles having a central unit, a program memory, a data memory, and an input/output unit having a plurality of input and output channels. The basic equipment can be laid out for a plurality of different individual design versions at the same time. A code memory for at least one code word for determining the respective individual design version is assigned to this basic version. At the time of installation in the vehicle or at a later time, the code word specific to the vehicle equipment version is input in the code memory to activate or enable the appropriate special controller version. The respective program sections, data records, input and/or output channels can be activated as a function of the content of the code memory. The controller version corresponding to the respective vehicle type is permanently defined by inputting the code word and by the code memory. If a modification is made at a later time, for example, by installing an additional component, this new component can be taken into account through a new code word if provision exists for doing so. However, the first version is then defined for the current operation of the vehicle. Thus, a code word is assigned to each version, the versions being defined and their number no longer being subject to changes.

The same holds true for German Published Patent Application No. 35 43 966, where a multicomputer system having at least one user-programmable memory is proposed, the programmable memory being connected to a first computer via a data bus. The other computers only have access to read-only memories in which different versions of data records are stored. Depending on the application, one or more defined data records can be selected for program processing via appropriate identifiers, which are stored in the user-programmable memory. This allows easy adaptation to certain applications without special multicomputer systems having to be provided for each application. However, even in this case the type and number of versions is fixed according to the data record defined.

Thus it can be seen that the related art cannot provide optimum results in all respects. Therefore the object of the present invention is to provide a flexible implementation of versions that is optimized for processing time and memory usage with respect to the external and internal requirements.

SUMMARY OF THE INVENTION

The present invention is based on methods for controlling operating sequences in a vehicle using at least one control unit having at least one non-volatile memory element, control being performed as a function of the respective vehicle version and/or control unit version, and the respective functions are selected during function selection by defining an identifier according to the version used, at least one predefinable data record and/or program code in the memory element corresponding to the selected functions. The data record and/or program code is selected from a plurality of data records and/or program codes.

In the method according to the present invention, the plurality of data records and/or program codes is advantageously generated during a version selection, and the identifier contains configuration parameters which are used for determining the data record and/or the program code, the respective identifier, i.e., the configuration parameters being used for the selection of the version and the selection of the function.

By using the same identifiers, i.e. switch elements, in configuring the software, in the application and function selection just before leaving the factory, the version handling can be implemented flexibly in a manner that is optimized for memory usage and processing time with respect to a variety of requirements. Thus the selection of versions itself, in particular of the required application data, can be influenced even after the characteristics have been determined.

Thus different vehicle models, equipment versions of vehicles and engines of a vehicle model can be advantageously operated with different data records but with a single software code. Thus the software developer can develop and service a single program code. A certain number of data records is advantageously generated in the application as determined by the switch elements.

DETAILED DESCRIPTION

Figure 1:
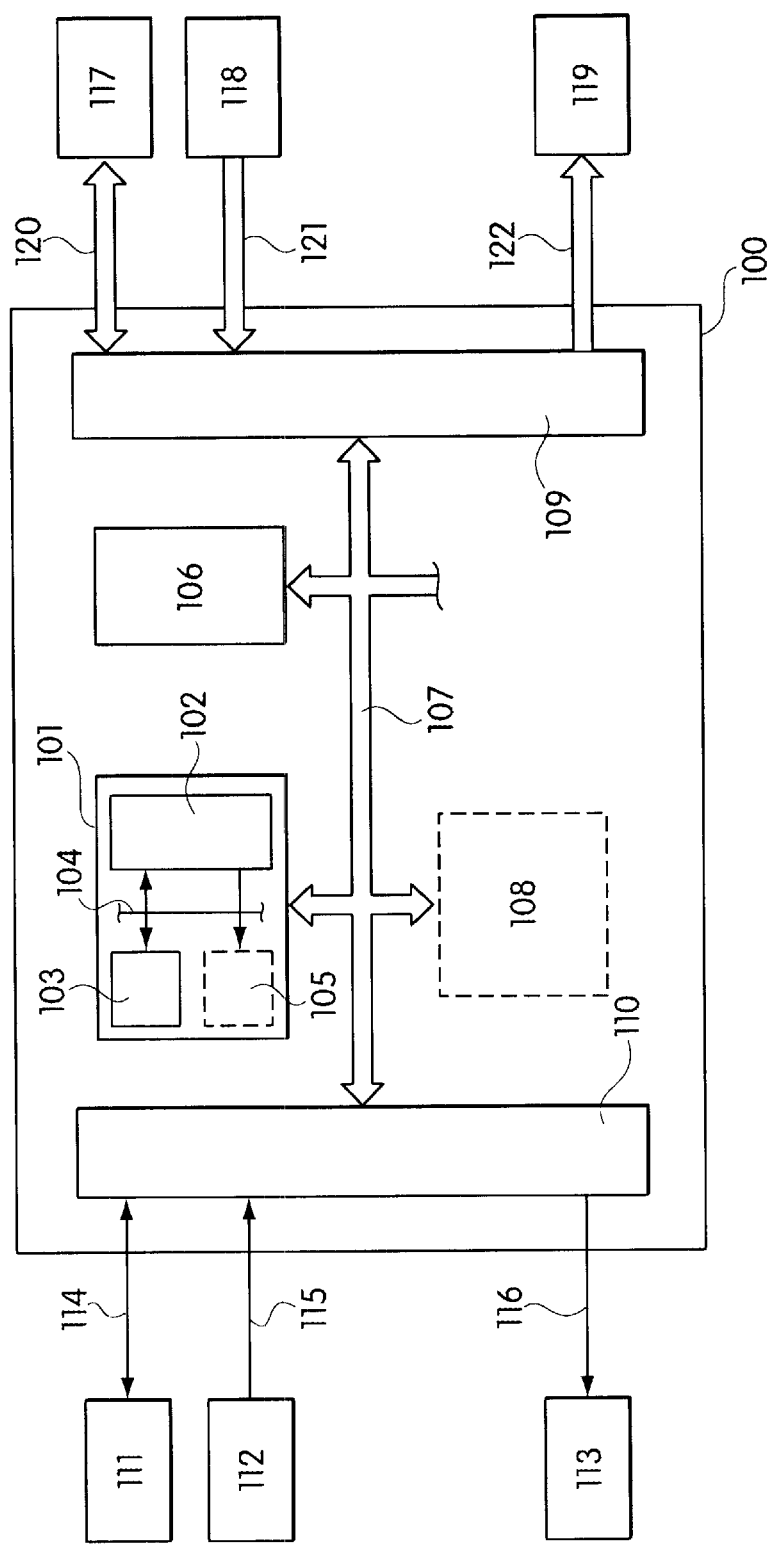
FIG. 1 shows a control unit and possible peripherals for controlling operating sequences in a vehicle.

FIG. 1 schematically shows a control unit 100 and its possible peripherals. The control unit contains a serial input/output component 110 and a parallel input/output component 109. Peripheral elements represented by peripheral element 111 are connected, serially and bidirectionally, to serial input/output component 110 by link 114. Peripheral element 111 symbolizes peripheral elements such as intelligent sensors or actuators, as well as integrated peripheral elements containing sensors and actuators or also additional control units that can be connected via serial interfaces, in particular, additional computing or controller units, for example for the application. Additional peripheral elements, represented by element 112, sensors in particular, are connected to control unit 100 unidirectionally via link 115 and deliver, for example, measured values or measurement results, in particular measurement results preprocessed, i.e., prepared by the control unit. Peripheral elements, in particular, actuators represented by element 113 are also serially controlled by the control unit via input/output component 110. Link 116 symbolizes the unidirectional signal transfer here.

Like the serial connection side, the control unit in this example has at least one parallel connection side symbolized by input/output component 109. Peripheral elements represented by element 117 are connected to it in parallel and bidirectionally, as symbolized by link 120. This can be a bus system in the vehicle having sensors and actuators, with additional control units and controller units of the vehicle that can be connected to it in parallel. Additional peripheral elements symbolized by element 118 and link 121 can also be connected unidirectionally and in parallel to the control unit; signals from these peripheral elements can only be transmitted to the control unit. Peripherals, in particular actuators, represented by element 119 and link 122, operated only in parallel and unidirectionally by control unit 100, are also conceivable.

The peripherals illustrated are optional in principle and may or may not be contained in the vehicle depending on the application and on the design of the control unit or different control units present in the vehicle.

The same holds true for the additional elements in the control unit itself which may vary depending on the control unit or control function in the vehicle. At least one microcomputer 101 is included which in turn contains a processor unit 103 and an internal memory 102, in particular a flash memory, or an internal register bank. In the following, the internal memory is designed as a non-volatile memory, in particular as a flash memory. They are connected to additional optional components 105 in microcomputer 101 and to one another via the internal conductor system or bus system 104. Additional elements 105, not illustrated individually, for example, may be additional memory elements, additional processor units, in particular for processing time computing, input/output components, or the like. Microcomputer 101 is connected to other components, for example, input/output components 109 and 110 via at least one conductor/bus system 107 within the control unit. Another memory element, in particular a non-volatile memory such as, for example, an EEPROM, a flash EPROM, an EPROM, a PROM, or a ROM 106 is contained in control unit 100, and connected to bus system 100. In the following we will assume an EEPROM, but a flash EPROM would also be conceivable. Other optional components, not illustrated for the sake of clarity, are symbolized by element 108. These can be, for example, additional microcomputers, additional processor units, additional memory element(s), internal sensors for temperature monitoring, for example, at least one power supply, etc.

An arrangement like that of FIG. 1 or comparable arrangements are used for controlling operating sequences in a vehicle. These are used in particular for controlling the drive units, the power train, in particular for controlling the transmission, a brake system or for controlling comfort and safety systems. In the framework of modern X by wire systems, these are also used for steering, braking, engine, or chassis control.

The control unit software can be divided in principle into program code and data. For application reasons the data is stored contiguously starting at a certain address. The content of the data record is determined by the vehicle itself, the components controlled, in particular the engine, and the elements affecting the engine characteristics. The number of possible equipment versions of a vehicle or of different vehicles, which can be collectively referred to as the number of different control versions, results in data records having different contents, i.e., data record versions adapted to the same program code or the same parts of the program code.

In the following, memory element 102 in microcomputer 101 is assumed to be non-volatile, in particular, a flash memory. The at least one data record for controlling operating sequences of the vehicle, as well as the program code, is stored in this memory. In principle, the software can be divided into program code and data. Different versions such as known from the related art are represented by different data record versions and different program parts. A plurality of such program codes and data is stored in memory 106, for example, an EEPROM, from where then the required data is selected, in particular just before leaving the factory, using a code word and transferred into memory 102 for control. One possible implementation is, for example, the use of a program code containing all functions and versions, with a plurality of contiguous data records. Data and code are stored in flash EPROM 102. When the control unit is initialized, a code word, in particular one or more code bytes or coding bytes are read from EEPROM 106, which selects the appropriate data record (1 out of X), for example by manipulating the address of the pointer to the data. All data records have the same structure adapted to the code. Thus, the vehicle versions are implemented in particular just before leaving the factory. The appropriate data record is stored as an identifier in EEPROM 106 via an input medium, in particular a diagnosis tester. It is also conceivable that one section of flash memory 102 be kept free, only programming it at a later time, in particular just before leaving the factory using the code word of the data record version to be selected.

The object is now to operate the different vehicle models, vehicle equipment versions, and engines of a vehicle model using different data records but a single software code. Thus the software developer can develop and service a single program code. A certain number of matching data records are also generated by the application. The characteristics of the respective version can be established as the software is generated or configured, i.e. as it is specified, using identifiers or switching elements stored in the data record as data IDs; these elements are referred to henceforward as version switches.

Version switches may result in the software running through different software paths when data is conditionally specified for the data record and/or when the software runs through the program code. Thus the version switches activate the appropriate functions and, in the case of conditional specification, select the particular application data. After program start, the version switches can be stored in messages, whereby accesses to the version switches in the program code takes place through access to the data record at the runtime of the program. Exclusive use of the version switches has the result that, once the characteristics have been established, the selection of the versions themselves, in particular the necessary application data, can no longer be influenced.

The subsequent selection, i.e., of function, which should only be defined at a later time, in particular just before leaving the factory, for example, whether or not the vehicle has an air-conditioning system and should the controlled accordingly, can be handled via additional switch elements or identifiers, referred to as function switches. These function switches result in the software running through different software paths as it runs through the program code. Access to the function switches at program runtime also takes place via messages which can be loaded in the initialization phase of the program either with the respective values from the data record, such as for example version switches, or with the appropriate values from the coding bytes from a non-volatile memory, in particular the EEPROM. Thus the required function of the respective version can be selected after the application has been closed using the function switches.

In the following, a distinction will no longer be made between version switch and function switch according to the present invention. The capabilities of both switch elements, i.e., identifiers are implemented by a single identifier, referred to in general in the following as a software switch, by the method according to the present invention. These software switches as identifiers can receive either values from the data record or values from the coding bytes of the non-volatile memory, the EEPROM coding bytes, depending on the configuration parameters. This is achieved by the fact that the software switch architecture of the respective switch is stored in a configuration file during software generation, as well as in the data record. Thus changing version switches into function switches and vice versa is no longer necessary.

Figure 2:
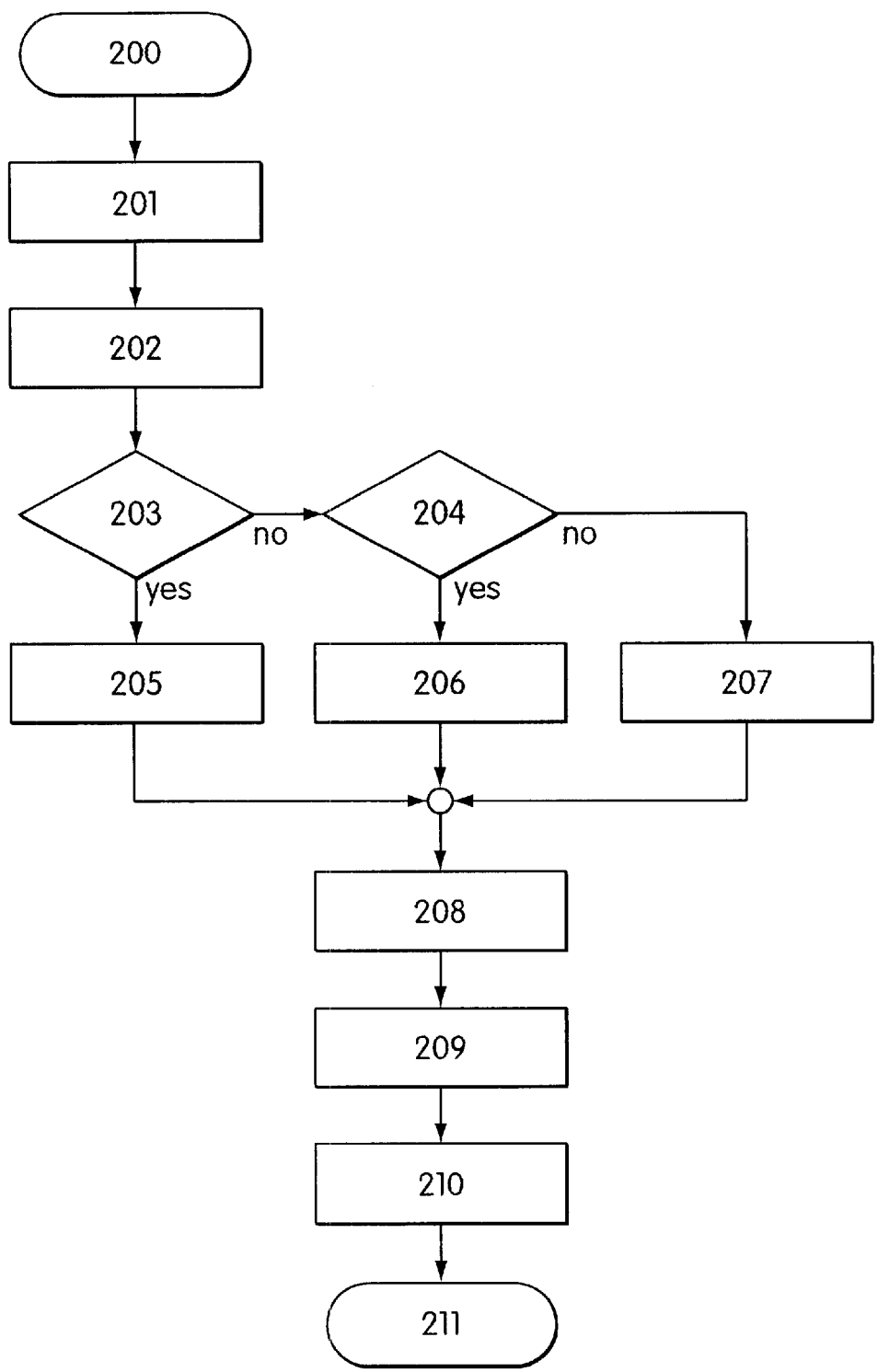
FIG. 2 shows, using a flowchart, how an identifier (switch elements) is generated.

FIG. 2 shows a procedure of defining or generating the software switches. Block 200 represents the start of the procedure if software switches are used as identifiers. Initially a software switch SWS is defined in the configuration file as a constant for software configuration or software generation in blocks 201 and 202. For this purpose an application data structure corresponding to the software switch structure during software generation is applied to the data record.

For this purpose the switch positions of the software switch are initially stored in block 201 as system constants during software generation. Thus, initially switch positions that the software switch can assume are defined. The possible switch positions are uniquely assigned as constants to a switch as switch positions. Thus software switch SWS1 to be defined here can assume constant switch positions 0, 1, and 2 for example. During control unit initialization it is then decided using these application values whether the switch value is read from non-volatile memory 106, in particular the EEPROM, or from the data record. Then the value read is written into a message which is accessed in the program code.

Subsequently the switch itself is stored in block 202. As the software is generated, software switch SWS1 itself is composed of two constants: one of these constants defines the value KWERT of the software switch and a second constant KTYP defines the switch type. One of the previously defined switch positions is assigned to the switch value. The following possibilities exist for the switch type.

An A type switch element that the switch value is read from the data record and later configurative or applicative changes in the switch type are not possible. This switch type is used for conditional specification. The switch value can be changed in the software configuration phase, but not in the application phase.

A B type switch element that the switch value is read from non-volatile memory 106, in particular the EEPROM. However, in the event of an invalid read access to the EEPROM, the data record value is used also in this case.

For a C type switch, the data record value is used as the switch value. This switch type can be applicatively changed to a B type switch, i.e., access to non-volatile memory 106 (EEPROM).

Thus, one of these types KTYP A, B, or C is assigned to software switch SWS1, defining from which memory location the data should be read. The corresponding switch position is defined in block 202. One of the previously defined switch positions 0, 1, 2 is assigned to switch value KWERT. Switch type and switch value, i.e., their contents (here A, B, C, and 0, 1, 2) thus also determine the data record(s) or the program code(s), almost like configuration parameters.

Similarly to the software switch definition during software configuration or software generation, the software switch structure is stored in the data record. For this purpose the switch structure for SWS1 is stored in the configuration file of the respective function of a component. The corresponding software switch is assigned to this data record switch via a configuration parameter during software generation. The appropriate switch type is stored in the data record in a similar manner, with a configuration parameter also being set to the corresponding switch type of the software generation.

Once the switch position has been defined in block 202, it is verified in query 203 whether or not the software switch suits the conditional specification. If this is the case, i.e., A type switch, block 205 of the conditional specification follows. The data to be specified conditionally is bracketed using an identifier in the overall data in block 205. The conditional specification is particularly advantageous in cases where the versions of software modules have the same data structure, but conversion of the physical values into machine code is different. This is the case when the same output quantity depends on different input quantities in the individual versions. For example, if a quantity is obtained optionally from two output quantities, for example, via a characteristic curve or a characteristics map, the characteristic curves are defined differently although they may be the same. The desired characteristic curve is selected in the program code using an application quantity. Therefore both characteristic curves are contained in the data record. If the characteristic curve is now specified conditionally, both characteristic curves are then specified with the same name in the configuration part. The required characteristic curve is selected during software configuration or software generation as a function of software switch SWS. Thus only the required characteristic curve is contained in the data record and therefore in the memory of the control unit. In this case the data to be specified conditionally is stored between unique identifiers in the data, whereby only this data surrounded by the identifier is specified during software generation as a function of the position of the software switch.

If it is determined via the switch value reflecting the instantaneous switch position that the switch does not suit the conditional specification but should activate version functions, query 204 follows, where it is queried whether or not the function, comparable to the function switch mentioned previously, should be activated after the application has been closed.

If the version function should only be activated after the application has been closed, block 206 follows, where it is determined, via the type definition, that the data should be read from the non-volatile memory, in particular from the EEPROM.

If the function is to be determined during the application, block 207 follows, where it is defined that the data record value is used as the switch value. Thus, although the data is read from the data record as in the case of conditional specification, this switch type can be applicatively modified so that the non-volatile memory, in particular, the EEPROM, can be accessed.

Subsequently the program goes from blocks 205, 206, and 207 to block 208. In block 208 the software switch architecture is stored in the configuration file. Subsequently in block 209 an enumerator identifier EID is stored in a predefinable data location, the EID being software switch-specific. In the event of access to non-volatile memory 106, the position of the switch with respect to the beginning of the switch location in non-volatile memory 106 is determined via the EID. Since two software switch types B and C may be considered in accessing nonvolatile memory 106, software switch SWS can thus be referenced.

Finally, the position of the software switch is queried in block 210 and the switch position is provided in a message which can be accessed during the program run. The position of SWS is queried during the process initialization of the respective vehicle component. The switch position obtained is stored in a message, which can be accessed by the component. For the switch type to be accessed directly in the program code, the switch type is referenced in the respective configuration file.

New data is loaded into the software switch preferably after the system has been turned off. After the system has been turned on, i.e., the control units have been initialized, the new configuration becomes available. Data can, however, also be loaded into software switch SWS during the current driving cycle, in particular, via an input medium (e.g. via a diagnosis tester). For time reasons the values are stored in the SWS message during initialization, i.e., after turning the ignition from OFF to ON, because the transmission time for loading from the EEPROM (106) would take too long for different transmission media, in particular for bus systems such as the I2C bus. When using faster transmission media (wire-bound, wireless), for example, a faster bus system, the SWS can be loaded with new data even during the driving cycle, whereby flexible reapplication would be possible, for example, in the event of an error. If reapplication of the control unit during vehicle operation is undesirable, this function can be blocked in the driving cycle.

The end of the software switch generation is reached in block 211, and the program structure is run through according to the software switch message.

Figure 3A:
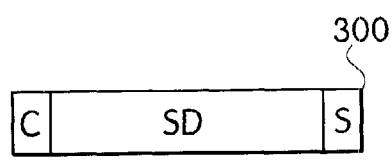
FIG. 3a is a first illustration of the contents of the identifier, i.e., of the switch element, according to an embodiment.
Figure 3B:
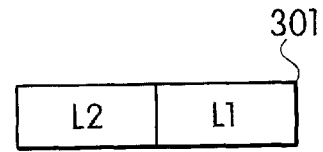
FIG. 3b is a second illustration of the contents of the identifier, i.e., of the switch element, according to the embodiment.
Figure 3C:
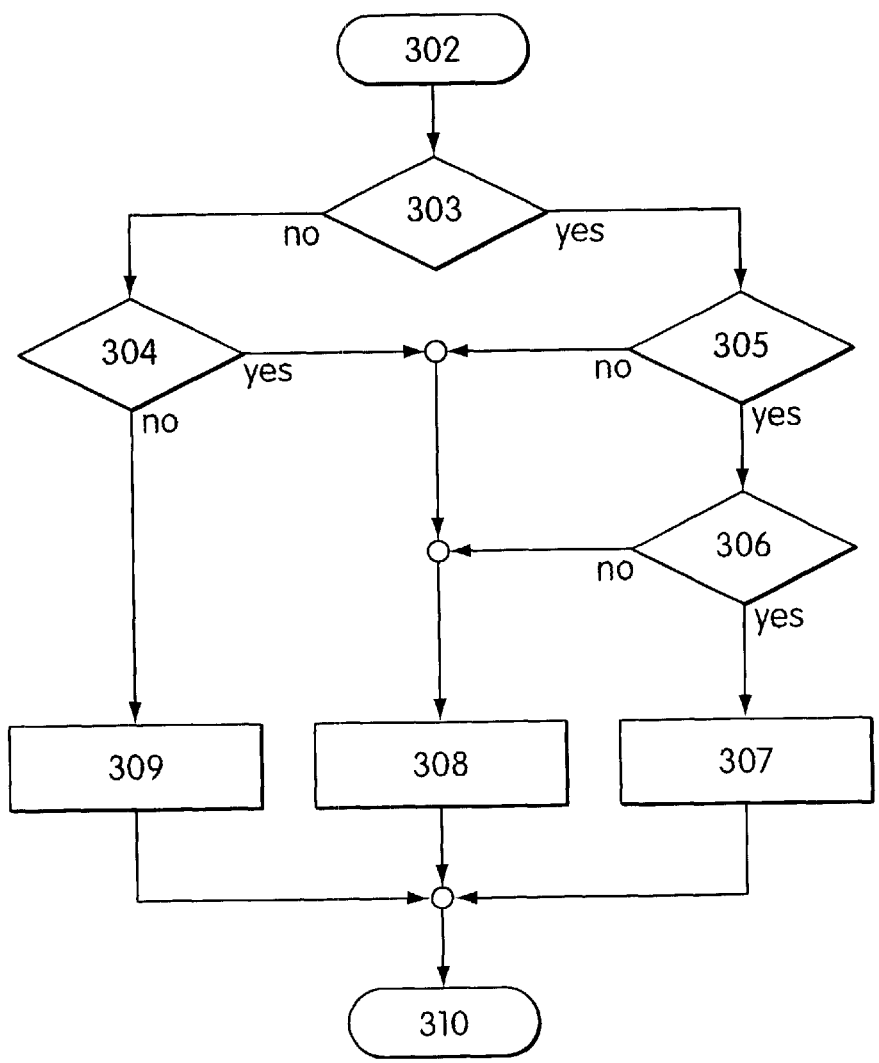
FIG. 3c is a third illustration of the contents of the identifier, i.e., of the switch element, according to the embodiment.

FIGS. 3a, 3b, and 3c show another possibility of loading data into the switch according to an advantageous embodiment. The original data identifiers for the switch in the data record, labeled below as label 1, L1, are extended by an additional identifier label 2, L2. After deleting non-volatile memory 102, labels 2 L2 receive the delete value of the memory, for example, which can be programmed after the application has been completed, in particular just before leaving the factory. This applies to a byte-by-byte or word-by-word programming of the non-volatile memory. If label 2 L2 is loaded with the inverse of the delete value, for example, setting the respective switch just before leaving the factory can be prohibited and the switch message is filled with the previously set value of label 1 L1. Both labels L1 and L2 are represented in FIG. 3b as block 301. The switch is illustrated as block 300 in FIG. 3a. C is a coding identifier here for deciding which values should be filled into the switch message, switch data SD. If coding identifier C, in particular one bit, is coded in non-volatile memory 106 (EEPROM) and safety check S, in particular a checksum, is okay over all switch data SD in non-volatile memory 106, the switch values are filled from the non-volatile memory (EEPROM) into the switch message; otherwise the switch values are loaded from data record 301. The coding bits, i.e., switch data SD, can be written into the EEPROM using the application device just before leaving the factory.

The procedure is illustrated again in FIG. 3c. The procedure is initiated in block 302. In query 303 it is verified whether label 2, 2L corresponds to the delete value. If this is the case, query 305 follows, where it is verified whether or not the non-volatile memory, in particular the EEPROM, is coded. If this is the case, query 306 follows, where the safety identifier S, in particular the checksum, is checked. If checksum S is okay, the switch is loaded with data from the non-volatile memory, the EEPROM. If the checksum is not okay, the switch is loaded with the original label L1 in block 308. If the EEPROM is not coded in query 305, i.e. coding identifier C is set to non-coded, the switch is also loaded with L1 in block 308. If label L2 is not loaded with the delete value in query 303, query 304 follows, where it is queried whether label L2 is loaded with the inverse delete value, i.e. with a value that is easy to recognize. If this is the case, basic label L1 is loaded into the switch in block 308. If neither the delete value nor the inverted delete value is programmed in label L2, the contents of additional label L2 is loaded into the switch. Then in block 310 the software is run according to the switch contents determined in blocks 309, 308, or 307.

Figure 4A:
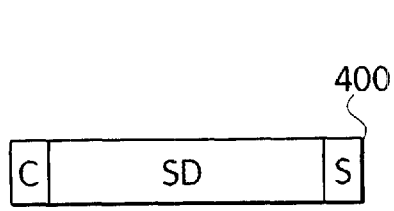
FIG. 4a is a first illustration of the contents of the identifier, i.e., of the switch element, according to another embodiment.
Figure 4B:
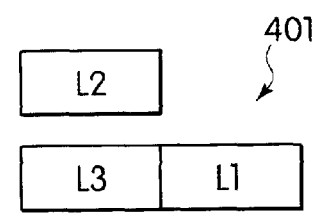
FIG. 4b is a second illustration of the contents of the identifier, i.e., of the switch element, according to the other embodiment.
Figure 4C:
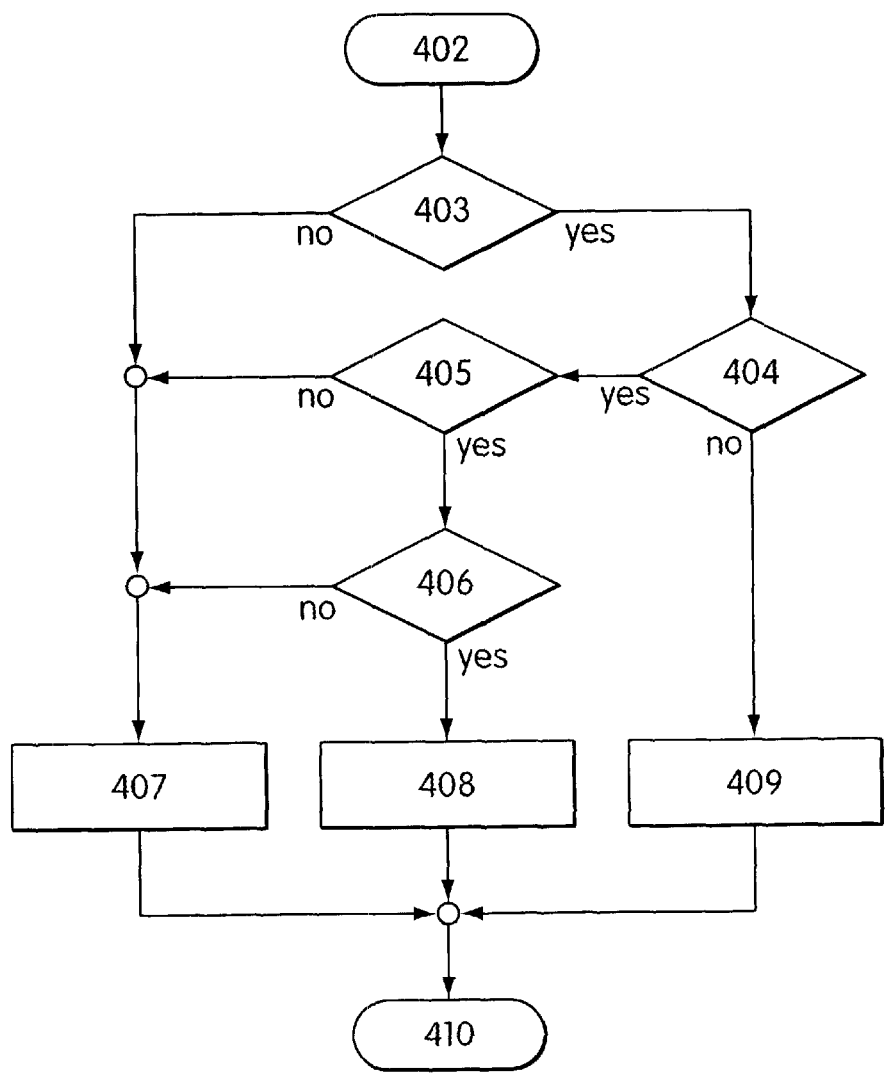
FIG. 4c is a third illustration of the contents of the identifier, i.e., of the switch element, according to the other embodiment.

FIGS. 4a, 4b, and 4c show the possible contents of the switch if a byte-by-byte or word-by-word programming, using flash memory technology, for example, is not possible. Then it may become necessary to load additional label L2 in a section, i.e., the smallest memory unit to be programmed. The data label for the switches in the data record, i.e., L1, is expanded this time by an additional label, an enable label L3. If the value of enable label L3 is filled with a valid value, the contents of the switch can be adjusted even after the application has been closed, i.e., in particular just before leaving the factory, by reprogramming label L2 or the respective bit of switch data SD. FIG. 4a shows again a switch whose periphery is labeled 400, a coding identifier C, switch data SD, and safety data, in particular a checksum S. The three aforementioned labels L1, L2, and L3 are shown in 401 in FIG. 4b.

In this case the switch messages are no longer necessary if the values are always programmed from switch data SD, the coding byte, i.e. original label L1 and additional label L2, into the same memory (e.g., flash EEPROM 102) of additional label L2, and this additional label L2, i.e., the memory location of label L2, is queried by the software.

This procedure is illustrated again in FIG. 4c. Block 402 shows again the start of the procedure, and query 403 shows the analysis of enable label L3. If the enable label is valid, i.e., is loaded with a valid value, query 404 follows, where it is checked whether label L2 is loaded with the delete value. If this is not the case, block 409 follows, where the switch is loaded with label L2. If the enable label in query 403 is not valid, block 407 follows, in which the switch is loaded with original label L1 . If in query 404 label L2 corresponds to the delete value of the non-volatile memory, query 405 follows, where it is checked as before (3c) whether or not coding identifier C is set. If it is set, i.e., the non-volatile memory is coded, query 406 follows, where the checksum, i.e. safety information S, is verified. If the check result is positive, in particular the checksum is okay, the switch is loaded with the EEPROM bits. If the sum is not okay, block 407 follows again. Block 407, loading of the switch with original label L1, also follows if coding identifier C indicated non-coded. Then in block 410 the program is run through depending on the contents of the switch.

What is claimed is:

1. A method of controlling an operating sequence in a vehicle in accordance with at least one control unit including at least one non-volatile memory element, comprising the steps of:

performing a control as a function of at least one of a respective vehicle version and a control unit version;

generating at least one of a plurality of data records and a plurality of program codes during a version selection operation;

selecting at least one of a predefinable data record and a program code from at least one of a corresponding one of the plurality of data records and a corresponding one of the plurality of program codes;

selecting respective functions during a function selection operation by defining an identifier according to the at least one of the respective vehicle version and the control unit version, wherein the at least one of the predefinable data record and the program code is stored in the at least one non-volatile memory element and corresponds to the selected functions;

determining the at least one of the predefinable data record and the program code in accordance with configuration parameters included in the identifier; and selecting the respective functions and the at least one of the respective vehicle version and the control unit version in accordance with the configuration parameters in the identifier.

2. The method according to claim 1, further comprising the step of:

storing a structure of the identifier in a configuration file for a software generation and in the predefinable data record.

3. The method according to claim 1, wherein:

the identifier includes a first parameter as one of the configuration parameters, the first parameter indicates at least one of the at least one non-volatile memory element and a memory location from which a value is to be read as a second parameter, and the second parameter defines, as another one of the configuration parameters, the at least one of the predefinable data record and the program code to be selected.

4. The method according to claim 3, further comprising the steps of:

defining the first parameter so that the value is read from the predefinable data record and a subsequent modification of the first parameter is prevented; and storing the predefinable data record in the at least one non-volatile memory element.

5. The method according to claim 4, further comprising the steps of:

performing a conditional specification in accordance with the first parameter; and storing data to be conditionally specified between unique identification symbols in the predefinable data record.

6. The method according to claim 3, further comprising the steps of:

defining the first parameter so that the value is read from an additional non-volatile memory; and reading the value from the predefinable data record in the event of an invalid read access in the additional non-volatile memory.

7. The method according to claim 3, further comprising the steps of:

defining the first parameter so that the value is read from the predefinable data record; and changing the first parameter so that the value is read from an additional non-volatile memory.

8. The method according to claim 1, further comprising the steps of:

loading the identifier with different identifier versions, wherein:

a first identifier and a second identifier are included in the predefinable data record as the different identifier versions, a third identifier is included in an additional non-volatile memory, and the first identifier is predefined and the second identifier is predefinable; and selecting the one of the different identifier versions with which the identifier is loaded as a function of a value of the second identifier.

9. The method according to claim 8, wherein:

a fourth identifier is included in the predefinable data record and is predefinable, the method further comprising the step of:

selecting the one of the different identifier versions with which the identifier is loaded from the first identifier, the second identifier, and the third identifier as a function of the fourth identifier and the second identifier.

10. The method according to claim 8, wherein:

a coding identifier is included in the identifier, the coding identifier indicating whether the third identifier is stored in the additional non-volatile memory, the method further comprising the step of:

selecting the one of the different identifier versions with which the identifier is loaded as a function of the coding identifier.

11. The method according to claim 8, wherein:

a safety identifier is included in the identifier, the safety identifier indicating whether the third identifier in the at least one non-volatile memory element is correct, the method further comprising the step of:

selecting the one of the different identifier versions with which the identifier is loaded as a function of the safety identifier.

12. A control unit for controlling an operating sequence in a vehicle including at least one non-volatile memory element, comprising:

an arrangement for performing a control as a function of at least one of a respective vehicle version and a control unit version;

an arrangement for generating at least one of a plurality of data records and a plurality of program codes during a version selection operation;

an arrangement for selecting at least one of a predefinable data record and a program code from at least one of a corresponding one of the plurality of data records and a corresponding one of the plurality of program codes;

an arrangement for selecting respective functions during a function selection operation by defining an identifier according to the at least one of the respective vehicle version and the control unit version, wherein the at least one of the predefinable data record and the program code is stored in the at least one non-volatile memory element and corresponds to the selected functions;

an arrangement for determining the at least one of the predefinable data record and the program code in accordance with configuration parameters included in the identifier; and an arrangement for selecting the respective functions and the at least one of the respective vehicle version and the control unit version in accordance with the configuration parameters in the identifier.

* * * * *